United States Patent Office 2,717,238
Patented Sept. 6, 1955

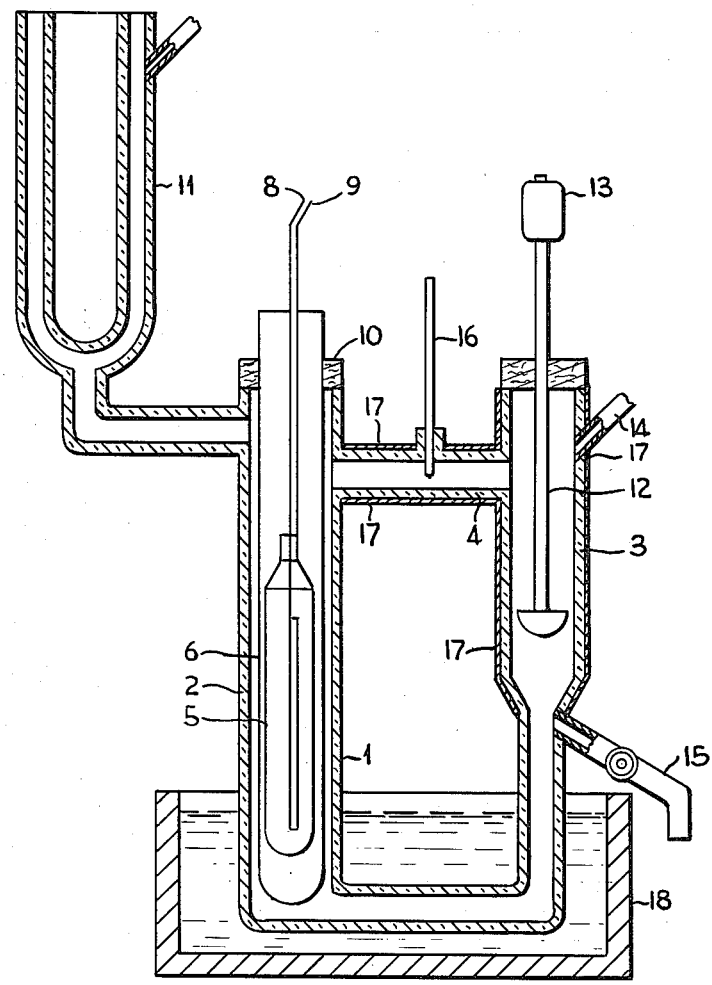

2,717,238

PREPARATION OF BENZENE HEXACHLORIDE

Joseph A. Neubauer, Pittsburgh, Pa., and Franklin Strain, Barberton, and Frederick E. Kung, Akron, Ohio, assignors to Columbia-Southern Chemical Corporation Application January 14, 1953, Serial No. 331,184

27 Claims. (Cl. 204—163)

This invention relates to the preparation of benzene hexachloride and it has particular relation to the preparation of benzene hexachloride under those conditions which will produce an optimum amount of the gamma isomer thereof.

It is known that benzene hexachloride may be prepared by reaction of benzene with chlorine in the absence of a chlorination substitution catalyst, such as ferric or aluminum chloride. This reaction may be facilitated by actinic light and/or by employing organic peroxides as a catalyst. Actinic light is that light, usually about 2500 to 4500 Å. in wave length, which produces chemical change.

At least five isomeric forms of benzene hexachloride are produced by conventional addition chlorination processes. These isomers have been designated as alpha, beta, gamma, delta, and epsilon isomers. For certain purposes, such as in the insecticidal field, it is generally recognized that a high content of the gamma isomer is desirable. Using the various chlorination processes now known in the art, the highest gamma isomer contents which can be achieved consistently range from about 12 to 16 per cent by weight of the benzene hexachloride produced.

In accordance with the present invention, a novel method of producing benzene hexachloride by the addition chlorination of benzene has been discovered, by operation of which gamma isomer percentages above 19 or 20 per cent by weight of the benzene hexachloride produced, and frequently gamma isomer percentages from 24 to 30 per cent or more by weight of the benzene hexachloride produced can be attained. Production of benzene hexachloride containing these unusually high gamma isomer percentages by addition chlorination of benzene is accomplished by introducing chlorine into a solution or mixture containing benzene and a solvent having a dielectric constant higher than that of benzene, preferably at least 4 at 20° C., maintaining the temperature of the solution below the freezing point of benzene, preferably minus 15° C. to minus 80° C., or minus 100° C., and establishing and controlling in the solution a critically low concentration of chlorine with respect to the benzene containing solution, such concentration being below about 1.5 per cent by weight of unreacted benzene and other constituents of the initial solution. For best results, this concentration should be below 1.0 per cent.

It appears that by the use of a solvent having a dielectric constant of at least 4 at 20° C., a reaction medium has been provided which has a dielectric constant that is higher than the dielectric constant of benzene per se.

By employing a proper solvent and apparently establishing a solution or mixture having a dielectric constant in excess of that of pure benzene, and by properly coordinated control of the temperature and chlorine concentration, it is possible to consistently achieve gamma isomer contents above 19 or 20 per cent by weight of benzene hexachloride, and where the optimum conditions are reverted to concentrations of up to 30 per cent and higher by weight of gamma isomer of benzene hexachloride may be attained. It is emphasized that coordinated control of these three conditions, use of solvent having a high dielectric constant, reaction temperature and chlorine concentrations, within the ranges herein disclosed is necessary to provide these unusually high gamma isomer concentrations.

The gamma isomer concentrations achieved by practice of these inventions are considerably higher than those now obtained by conventional chlorination methods, and they are achieved without any reduction in the yield of benzene hexachloride obtained by conventional chlorination processes. Nearly quantitative yields of benzene hexachloride are prepared, the usual yield exceeding 90 per cent, based upon the amount of chlorine employed.

In order to achieve the contemplated high gamma isomer concentration, it appears that a reaction solution or mixture having a high dielectric constant is required. That is, the dielectric constant of the reaction solution or mixture containing benzene should be higher than the dielectric constant of liquid benzene under the same conditions.

According to Circular 514 of the National Bureau of Standards published August 10, 1951, entitled "The Dielectric Constants of Pure Liquids," the temperature dependence of dielectric constants of various liquids may be expressed by this empirical formula:

$$Et_2 = A - a(t_2 - 20° \text{ C.})$$

where A is the dielectric constant of the liquid at 20° C., $a$ is an empirical number which varies with the liquid and $t_2$ is in degrees centigrade. For benzene, the formula is:

$$Et_2 = 2.284 - 0.002 (t_2 - 20° \text{ C.})$$

It will be noted that this formula does not take into account what happens at temperatures below the freezing point of benzene. However, this correlation establishes that the dielectric constant of benzene varies inversely with temperature, the lower the temperature the higher the dielectric constant.

According to this invention, it appears necessary to establish a reaction solution or mixture which has a dielectric constant that is higher than pure liquid benzene under the same reaction conditions. For the purposes of this invention, the theoretical dielectric constant of liquid benzene at temperatures below 20° C., and as low as minus 100° C., may be considered equivalent to the value obtained by employing the above formula as if it were applicable to these low temperatures.

This reference to a dielectric constant for benzene at temperatures below the freezing point of benzene is not an arbitrary means of defining the dielectric characteristics of the mixture or solution. It is actually possible to provide liquid reaction mediums containing benzene which have dielectric constants that are the same or essentially the same as this theoretical dielectric constant of benzene for temperatures below 6° C. Such mixtures or solutions do not provide the high gamma isomer concentrations attained by recourse to this invention.

In this regard, it may be pointed out that liquid reaction solutions of benzene and carbon tetrachloride have dielectric constants which are essentially the same as the dielectric constant calculated for benzene by employing the aforementioned formula at temperatures below 6° C. The gamma isomer concentrations obtained by employing a reaction solution of benzene and carbon tetrachloride are invariably below the concentrations achieved by practice of this invention, all other reaction conditions being the same.

This invention is practiced with reaction solutions or mixtures having a dielectric constant above 2.3, such as at least about 4 or higher. It will be observed that the correction factor for the dielectric constant of benzene due to decreases in temperature is quite small and does not vary greatly from 2.28, the dielectric constant of benzene at 20° C. As a practical matter, any reaction mixture whose dielectric constant substantially exceeds 2.3 should, therefore, provide enhanced gamma isomer concentrations if the other conditions herein specified are observed.

The gamma isomer concentration and the dielectric constant of the reaction mixture apparently are interrelated. Increasing the dielectric constant of the reaction mixture should result in higher gamma isomer concentrations, all other reaction conditions being properly controlled. In general, a reaction mixture having a dielectric constant of approximately 4 may be expected to provide a product containing from 19 to 21 per cent gamma, with proper chlorine concentrations and temperatures being employed. With a reaction mixture having a dielectric constant of about 10 to 12 products containing 24 to 28 per cent by weight of the gamma isomer may be expected. Gamma isomer concentration of 30 per cent are attained with reaction mixtures apparently having higher dielectric constant, such as with a mixture having a dielectric constant of about 22.

As has already been pointed out, some variation in the dielectric constant of the reaction mixture is to be expected due to temperature changes. However, such variations are usually minor and a reaction mixture which has a dielectric constant of at least 4 at any temperature should be satisfactory under normal circumstances for practicing this invention.

Liquid reaction solutions containing benzene and having the desired dielectric constant characteristics may be prepared by forming a solution of benzene and an appropriate solvent for the benzene. As a general rule, this solvent should have a substantially higher dielectric constant at any given temperature than that of benzene at such temperature. Thus, solvents which have dielectric constants substantially above 2.284 at 20° C., notably 4 or higher, and whose dielectric constant varies inversely with temperature are satisfactory. It is likewise possible to employ solvents whose dielectric constants decrease as their temperature is lowered, provided that at any given temperature between 5° C. and minus 100° C. and at which the process is to be performed, their dielectric constant is above that of benzene such as above 4.

Solvents which have appropriately high dielectric constants may be generically characterized as polar solvents. Notably, polar solvents having dipole moments of at least about $1.0 \times 10^{18}$ E. S. U. at 15–30° C. are those which are suitable. Therefore, this invention may be practiced by establishing a reaction solution or mixture of benzene and a polar solvent, introducing chlorine into the solution in the presence of an addition chlorination catalyst, such as actinic light, maintaining a substantial chlorine concentration in said mixture below about 1.5 per cent by weight of unreacted benzene and solvent, maintaining the reaction temperature below the freezing point of benzene and above the temperature at which the reaction mixture freezes.

Besides having the desired dielectric constant characteristics, the solvents must form liquid reaction solutions with benzene at the reaction temperatures, such as below the freezing point of benzene. The solvent should also preferably be inert at the reaction conditions. It is emphasized that the solvent should not seriously interfere with addition chlorination. Thus, certain solvents which otherwise appear to satisfy the general requirements for use in this invention are unsatisfactory because addition chlorination of the benzene does not proceed in their presence. For example, nitromethane is unsuitable because it apparently exerts some inhibitory effect on the desired reaction. Therefore, an inert solvent may be considered for the purposes of this invention as a solvent which does not react under the reaction conditions and does not otherwise adversely effect the additive chlorination reaction. Solvents, however, which chlorinate or otherwise react only slightly or which upon chlorination form economically valuable products are useful.

Especially good solvents for this purpose are the partially halogenated hydrocarbons containing up to and including 4 carbon atoms, and in which at least one carbon atom is linked to at least one halogen atom and at least one hydrogen atom. Best results have been obtained with partially chlorinated hydrocarbons of this class containing 1 or 2 carbon atoms such as methylene dichloride, methyl chloride, chloroform or ethylene dichloride. However, other compounds such as 1,1,1-trichloroethane, 1,1,2-trichloroethane, tertiary butyl chloride, secondary butyl chloride, isopropyl chloride, isobutyl chloride, n-propyl chloride, 1,1,2,3-pentachloropropane, higher butane halides containing up to and including 4 carbon atoms, and analogous bromides, iodides or fluorides may be employed. Other solvents that may be employed are acetic acid, propionic acid, a propionicacetic acid mixture, acetic anhydride, acetyl chloride, liquid sulfuryl chloride, methyl sulfate, and liquid phosgene. In fact, it appears that any benzene solvent having the qualifications hereinbefore enumerated and in the presence of which addition chlorination of benzene will occur is useful for the purposes of this invention.

The amount of solvent that may be employed with the benzene varies considerably, such as from 5 or 10 to 99 per cent by weight of the mixture of benzene and solvent. Reaction solutions having higher dielectric constants are to be expected when the concentration of the solvent is higher e. g. 30 to 95 per cent by weight of the solution. Thus, it has been found that by maintaining all other reaction conditions constant and increasing the concentration of the solvent, higher gamma isomer percentages are attained.

It is desirable that there be present with the benzene sufficient solvent to produce a liquid solution of these components at the temperature of reaction. More solvent is normally required to maintain the reaction mixture in the liquid state in accordance with the freezing point curve of the mixture as lower reaction temperatures are employed. As previously noted, solvent concentrations as high as 99 per cent are operable and within the scope of this invention. However, although use of high solvent concentrations results in a product containing optimum gamma isomer concentrations, it also necessitates the removal and recycling of the large quantities of solvent, particularly in a continuous process. Therefore, the choice of a high ratio of solvent to benzene is to be guided not only by the quality of the product desired but also by economic considerations in production of a marketable product. Also, at high solvent concentrations there is a greater tendency for chlorination of the solvent thereby reducing the chlorine efficiency of the process. For most purposes, a solvent concentration of from 30 to 95 per cent by weight of the mixture should be used.

The reaction is conducted at a temperature which is sufficiently low to ensure a high percentage of the gamma isomer in the product. Temperatures which are necessary to attain concentrations of gamma isomer in the product in excess of 19 or 20 per cent by weight, in the most favorable combination with the above mentioned reaction variables, have been found to be below 6° C., the freezing point of benzene, but above the point at which the mixture of benzene and solvent solidifies. Since the cost of refrigeration is an important factor, it is advantageous to conduct the process at temperatures between plus 6° C. and minus 20° C. However, data based upon experiment show that as the reaction is conducted at even lower temperatures, for example, minus 40° C. to minus 60° C., higher percentages of gamma isomer are obtained when the proper amount and type of solvent and concentration of chlorine are employed. Hence, for optimum results, temperatures of about minus 10° C. to minus 80° C. are used.

The reaction may be performed at sub-atmospheric pressures and super-atmospheric pressures as well as at atmospheric pressure. Cooling of the reaction mixture is accomplished by conducting the reaction at sub-atmospheric pressure and refluxing the solvent.

As stated above, the concentration of chlorine which must be maintained in the reaction mixture during the reaction is very low, being below about 1.5 per cent by weight of unreacted benzene and solvent and preferably being about 0.005 to 1.0 per cent by weight of unreacted benzene and solvent. Chlorine concentrations as low as 0.001 per cent by weight of unreacted benzene and solvent have been found to be within the purview of the invention. The ranges within which the chlorine concentration must be maintained in order to produce benzene hexachloride containing above 19 or 20 per cent by weight of gamma isomer thereof, as well as the optimum chlorine concentration within such ranges, vary according to the temperature of reaction, the solvent used, and the concentration of the solvent. This can be appreciated more clearly by reference to a table set forth in Example I below showing the results of many experiments performed to determine the proper operating conditions necessary to attain gamma isomer percentages above 19 or 20 per cent. Best results are obtained where the chlorine concentration is less than about 0.3 per cent.

Although maximum gamma isomer contents are attained when the chlorine concentration is below about 0.3 per cent, it may sometimes be more economical to practice the process at higher concentrations, but below about 1.5 per cent. The rate at which the reaction proceeds is related to chlorine concentration, with higher concentrations favoring increased reaction rates. In commercial operations, the respective advantages of gamma content and reaction rate may be balanced to achieve optimum gamma isomer production for a given unit of equipment. This necessitates, under most conditions, sacrificing maximum gamma contents of 24 to 30 per cent for gamma contents of from 21 to 23 per cent to take advantage of higher reaction rates favored by the higher chlorine concentrations. Thus, for example, chlorine concentrations of about 0.6 per cent, rather than 0.3 per cent, have been used to compromise the desirability of both high gamma contents and high reaction rate.

The invention is performed by placing benzene and the solvent in a reactor equipped with a light and introducing, with the light source inoperative, liquid or gaseous chlorine into the reaction mixture at a constant rate. Preferably, this rate of addition is essentially equal to the rate of chlorine consumed when the light is in operation. When a predetermined concentration of chlorine in the reaction mixture is reached (a concentration which is within the limits set forth above), irradiation of the reaction mixture is begun. While irradiation may be begun immediately upon the start of chlorine addition, it is more difficult to establish and maintain the proper chlorine concentration if irradiation is begun before the desired chlorine concentration is established. The concentration of chlorine is maintained as nearly constant as possible during the reaction by varying the flow of chlorine to the reaction or by varying the intensity of the irradiation in order to alter the rate at which the chlorine is consumed when the concentration becomes unduly low or high. The concentration of the chlorine is checked at regular intervals by withdrawing a sample of the reaction mixture and analyzing it, or by continuous analysis, for example, employing spectroscopic methods.

The reaction is usually continued until precipitation of benzene hexachloride begins, for example, when approximately 18 per cent by weight of the benzene has been reacted, if the solvent is a minor proportion of the reaction mixture, such as less than half of the reaction mixture. However, it may be continued until even greater percentages of benzene are reacted, especially if the major portion of the reaction mixture is solvent, continuing on until substantially all, 95 per cent or more, of the benzene has been converted to benzene hexachloride. One reason for discontinuing the reaction at benzene conversions of approximately 18 per cent is that the reaction mixture tends to become a sludge at higher conversions, and other problems are encountered although these problems do not materially affect the production of gamma concentrations of greater than 20 per cent by weight in accordance with the invention. A further consideration in discontinuing the reaction before all the benzene is converted is that at higher conversions when there is very little benzene present, the solvent competes with benzene for chlorine, and undesirable substitution chlorination of the solvent occurs. Consequently, to avoid serious reaction of chlorine with the solvent, the reaction should be discontinued before more than 50 to 75 per cent of the benzene is reacted or while the benzene concentration of the solution exceeds 1 or 2 per cent by weight, based on the weight of unreacted benzene and solvent.

For best results, certain precautions should be taken in the performance of the invention. The presence of air or other impurities in the reaction zone is to be avoided. This is particularly true when sampling of the reaction mixture is being carried out. The benzene, chlorine, and solvent are purified prior to reaction by suitable methods, such as distillation, with the ends being discarded. The reaction system is purged with nitrogen prior to introduction of chlorine, and the chlorine is introduced in the presence of nitrogen. Furthermore, it is desirable that the reaction mixture be free from all substances which might promote substitution chlorination of benzene or of the solvent.

The following examples illustrate the practice of the invention but are not to be construed as imposing any limitation thereon:

EXAMPLE I

The apparatus for some of the experiments consisted of a 500 or 1000-milliliter, three-necked flask fitted with a stirrer, thermometer, inlet and outlet tubes. The inlet tube extended well below the level of the liquid reaction mixture. The flask was cooled with a Dry Ice-acetone mixture placed in a suitable container. The remainder of the experiments were performed with a circulatory apparatus having a capacity of about 450 milliliters. The description of the circulatory apparatus may be more clearly understood by reference to the accompanying drawing.

The circulatory apparatus consisted of a U-shaped glass tube 1 (similar to a Thiele melting point tube) having vertical columns 2 and 3 and a glass tubular member 4 connecting the upper portion of each vertical column of the U-shaped tube to create a circular continuous path within the apparatus. The vertical columns 2 and 3 had openings at the top of the columns. An elongated Mazda lamp 5 was placed in a glass protector tube 6 having an outside diameter of approximately 4 centimeters, and the tube 6 was placed in the vertical column 2 having an outside diameter of approximately 6 centimeters. The lamp 5 was connected to a variable resistor (not shown) by means of suitable leads 8 and 9. The glass protector tube 6 was held in place by means of a rubber stopper 10 in the opening of vertical column 2. Near the top of vertical column 2 an opening was provided leading to a Dry Ice condenser 11 for condensing low boiling solvents, and the condenser was connected to suitable traps (not shown) for collecting any HCl driven off during the reaction.

A high speed propeller 12, driven by a suitable motor 13, was inserted in vertical column 3. An inlet 14 for introduction of chlorine and nitrogen was provided near the top of vertical column 3, and an outlet 15 for removal of samples of the reaction mixture during the reaction and for removal of the product was provided near the bottom of vertical column 3. The temperature of the reaction mixture was measured by a thermometer 16 inserted in tubular member 4.

Tubular member 4 and the upper portion of vertical column 3 were shielded from light by a coating of chlorinated isoprene 17. The lower portion of the circulatory apparatus was placed in a container 18 containing a dry ice-acetone mixture suitable for cooling of the reaction mixture.

Prior to the reactions, benzene and solvent were specially purified. The benzene was partially photochlorinated to remove small amounts of easily chlorinatable impurities and then distilled, while the solvent was distilled through a 15-plate column to remove any inhibitory materials.

A solution of solvent and benzene was placed in the reactor. This solution varied as to the amount of solvent present with the benzene. Usually, 130 grams of benzene was employed. The apparatus was flushed with nitrogen for 30 to 60 minutes and then cooled to the reaction temperature as desired. These temperatures are shown in Table I below in which the reaction conditions and results of a number of experiments performed in the manner herein described are tabulated.

Gaseous chlorine (at the rate of about 0.1 to 0.6 gram per minute, usually at about 0.6 gram per minute) and nitrogen (at the rate of 0.05 to 0.1 mole per hour) were mixed and passed into the reaction flask. The reaction mixture was illuminated by a lamp placed ½ inch away from the 500 or 1000-milliliter flask or placed within the circulatory apparatus as described above and powered through a variable resistor so that the light intensity could be varied by changing the voltage. When the flask was used, the lamp which was used was a "Hanovia" of 125-watt output or a 400-watt AH-1 or a 100 or 200-watt Mazda lamp of the type normally used in room illumination. In the circulatory apparatus, showcase T-10 Mazda lamps of 40, 80, and 120-watt output or a "Uviarc" ultraviolet lamp having an output of 250 watts were employed either singly or in combination.

The chlorine concentration was maintained as nearly as possible throughout the reaction at the predetermined initial concentration by maintaining the reaction conditions such that the chlorine is reacted at about the same rate as the rate at which it enters the reaction mixture. This was controlled by varying the amount of actinic irradiation or varying the rate of chlorine entering the reaction. The former was acomplished by varying the distance of the light source from the reaction of varying the voltage applied to the light source.

During the reaction, the chlorine concentrations were generally determined at 15-minute intervals. This was done by transferring 1 to 4 grams of the mixture into a tared flask containing potassium iodide solution. The weight of the sample was thus obtained, and the liberated iodine was titrated with 0.01 to 0.1 N sodium thiosulfate. The concentration of chlorine was calculated to find per cent by weight of chlorine present in the sample for all experiments.

All experiments listed in the table were discontinued at approximately 18 per cent conversion of the benzene unless otherwise noted. For the experiments in which the reaction was carried out to substantially 100 per cent conversion of the benzene and for those experiments in which the benzene concentration at the beginning of the reaction was 62 per cent by weight of the reaction mixture, the chlorine concentration, calculated upon a sample basis, was converted to per cent by weight of chlorine in unreacted benzene plus solvent by means of the following equation:

$$\text{Percent by weight } Cl_2 \text{ in } C_6H_6 \text{ plus solvent} = \frac{A(B+S+C)}{B+S-\frac{78}{213}\left[C-\frac{A(B+S+C)}{100}\right]}$$

in which
$A$ = per cent by weight of chlorine in sample,
$B$ = grams of benzene charged,
$S$ = grams of solvent charged, and
$C$ = grams of chlorine added up to the time of analysis.

At low conversions of benzene (18 per cent and lower) and when high initial concentrations of solvent, for example, 72, 83, and 95 per cent by weight of the reaction mixture, are employed, the calculation of the chlorine concentration on a sample basis was sufficient to show the chlorine concentration in unreacted benzene plus solvent since use of the equation above disclosed gives practically the same chlorine concentration. The chlorine concentrations shown in the table below are average values, in per cent by weight of chlorine in benzene plus solvent, for the particular experiment.

The initial concentration of solvent is listed in per cent by weight of solvent plus benzene. The yield is listed as per cent by weight, based upon the weight of chlorine charged.

The benzene hexachloride was recovered by distilling off the unreacted benzene and solvent and finally heating the reaction mixture to a liquid temperature of 140–150° C. at 10 millimeters of mercury pressure for 10 minutes. The molten benzene hexachloride at 140° C. was flaked on a nickel sheet at 25° C., ground and analyzed by infrared analysis for the various isomers. The results obtained were as follows:

*Table I*

| Reaction Temp., °C. | Halogenated Hydrocarbon | Halogenated Hydrocarbon Conc. (Percent) | Chlorine Conc. (Percent) | Yield (Percent) | Isomer Content (Percent) | | | | | Apparatus Used | Comments |
|---|---|---|---|---|---|---|---|---|---|---|---|
| | | | | | Alpha | Beta | Gamma | Delta | Epsilon | | |
| −60 | $CH_2Cl_2$ | 72 | 0.02 | 95 | 58 | 7 | 26.3 | 7 | 1 | (B) | |
| −60 | $CH_2Cl_2$ | 72 | 0.04 | 92 | 58 | 8 | 26.3 | 7 | 1 | (B) | |
| −60 | $CH_2Cl_2$ | 72 | 0.07 | 96 | 56 | 10 | 24.0 | 10 | 1 | (B) | |
| −60 | $CH_2Cl_2$ | 72 | 0.21 | 95 | 54 | 15 | 19.3 | 12 | 1 | (B) | |
| −60 | $CH_2Cl_2$ | 72 | 0.5 | 96 | 52 | 17 | 17.3 | 13 | 1 | (B) | |
| −60 | $CH_2Cl_2$ | 72 | 1.6 | 92 | 49 | 20 | 12.0 | 17 | 3 | (B) | |
| −60 | $CH_2Cl_2$ | 72 | 2.3 | 92 | 48 | 17 | 14.5 | 16 | 5 | (B) | |
| −40 | $CH_2Cl_2$ | 83 | 0.08 | 96 | 60 | 6 | 26.8 | 7 | 1 | (B) | 100% conversion, 1.4% substitution. |
| −40 | $CH_2Cl_2$ | 83 | 0.07 | 90 | 60 | 6 | 25.8 | 7 | 2 | (B) | 100% conversion. |
| −40 | $CH_2Cl_2$ | 72 | 0.03 | 96 | 62 | 5 | 25.5 | 6 | 1 | (B) | |
| −40 | $CH_2Cl_2$ | 72 | 0.27 | 96 | 58 | 11 | 22.5 | 10 | 1 | (B) | |
| −40 | $CH_2Cl_2$ | 72 | 0.6 | 96 | 55 | 14 | 19.0 | 11 | 1 | (B) | |
| −40 | $CH_2Cl_2$ | 72 | 1.7 | 93 | 47 | 14 | 15.3 | 16 | 6 | (B) | |
| −40 | $CH_2Cl_2$ | 72 | 3.0 | 96 | 45 | 13 | 15.5 | 16 | 7 | (B) | |
| −40 | $CH_2Cl_2$ | 72 | 0.01 | 87 | 65 | 2 | 27.8 | 4 | 2 | (A) | 4% conversion. |
| −40 | $CH_2Cl_2$ | 72 | 0.04 | 87 | 62 | 5 | 27.3 | 5 | 1 | (A) | 5% conversion. |
| −40 | $CH_2Cl_2$ | 72 | 0.13 | 91 | 61 | 7 | 25.5 | 7 | 0.3 | (A) | 7% conversion. |

Table I—Continued

| Reaction Temp., °C. | Halogenated Hydrocarbon | Halogenated Hydrocarbon Conc. (Percent) | Chlorine Conc. (Percent) | Yield (Percent) | Isomer Content (Percent) | | | | | Apparatus Used | Comments |
|---|---|---|---|---|---|---|---|---|---|---|---|
| | | | | | Alpha | Beta | Gamma | Delta | Epsilon | | |
| −40 | CH₂Cl₂ | 72 | 0.09 | 93 | 62 | 6 | 26.0 | 6 | 0.3 | (A) | 7% conversion, 0.3 g./min. of Cl₂. |
| −40 | CH₂Cl₂ | 72 | 0.0024 | 78 | 71 | 2 | 17.5 | 5 | 3 | (A) | 5% conversion. |
| −40 | CH₂Cl₂ | 72 | 0.003 | 78 | 73 | 1 | 16.3 | 5 | 3 | (A) | 5% conversion, 0.10 g./min. of Cl₂. |
| −40 | CH₂Cl₂ | 72 | 0.038 | 92 | 65 | 4 | 26.0 | 4 | 0.3 | (A) | 0.04 g./min. of Cl₂. |
| −40 | CH₂Cl₂ | 72 | 0.008 | 88 | 69 | 2 | 20.0 | 5 | 3 | (A) | 2% conversion, 0.17 g./min. of Cl₂. |
| −40 | CH₂Cl₂ | 72 | 0.04 | 94 | 64 | 4 | 26.0 | 5 | 1 | (A) | 1.4 g./min. of Cl₂. |
| −40 | C₂H₄Cl₂ | 83 | 0.02 | 88 | 62 | 4 | 28.8 | 5 | 1 | (B) | 7.3% substitution, 25.8 gamma isomer by chromatographical analysis. |
| −32 | CH₃CCl₃ | 70 | 0.004 | | 60 | 6 | 19.2 | 11 | 5 | (A) | |
| −25 | CH₃CCl₃ | 80 | 0.114 | | 55 | 8 | 18.6 | 12 | 4 | (A) | |
| −25 | CH₃CCl₃ | 80 | 0.002 | | 58 | 4 | 19.0 | 12 | 7 | (A) | |
| −25 | CH₃CCl₃ | 80 | 0.180 | | 55 | 6 | 19.5 | 12 | 8 | (A) | |
| −25 | CH₃CCl₃ | 80 | 0.189 | | 52 | 6 | 19.3 | 13 | 8 | (A) | |
| −25 | CH₃CCl₃ | 80 | 0.092 | | 51 | 6 | 18.8 | 13 | 11 | (A) | |
| −21 | CCl₂F₂ | 83 | 0.03 | 95.5 | 65 | 12 | 17.0 | 6 | 1.0 | (B) | |
| −21 | CCl₂F₂ | 83 | 0.13 | 96.4 | 61 | 15 | 16.5 | 8 | 0.5 | (B) | |
| −21 | CCl₂F₂ | 83 | 0.39 | 95.3 | 58 | 17 | 16.0 | 9 | 0.3 | (B) | |
| −21 | CCl₂F₂ | 83 | 0.65 | 99.2 | 58 | 16 | 16.5 | 9 | 1 | (B) | |
| −21 | CCl₂F₂ | 83 | 1.0 | 96.6 | 58 | 17 | 15.8 | 9 | 1.0 | (B) | |
| −20 | CH₃Cl | 83 | 0.02 | 35 | 70 | 3 | 21.8 | 5 | 1 | (A) | 46% substitution. |
| −20 | CH₃Cl | 83 | 0.09 | 61 | 65 | 5 | 24.0 | 6 | 1 | (A) | 15% substitution. |
| −20 | CH₃Cl | 83 | 0.14 | 77 | 64 | 6 | 24.0 | 6 | 1 | (A) | 14% substitution. |
| −20 | CH₃Cl | 83 | 0.27 | 59 | 61 | 7 | 23.5 | 7 | 1 | (A) | 5.4% substitution. |
| −20 | CH₃Cl | 83 | 0.59 | 72 | 59 | 9 | 23.0 | 8 | 1 | (A) | 5.4% substitution. |
| −20 | CH₃Cl | 83 | 1.02 | 71 | 58 | 10 | 21.5 | 9 | 1 | (A) | 5.8% substitution. |
| −15 | CH₂Cl₂ | 95 | 0.02 | 61 | 72 | 3 | 18.3 | 5 | 2 | (C) | |
| −15 | CH₂Cl₂ | 95 | 0.16 | 90 | 65 | 4 | 24.5 | 6 | 1 | (C) | |
| −15 | CH₂Cl₂ | 95 | 0.42 | 93 | 62 | 6 | 22.8 | 8 | 1 | (C) | |
| −15 | CH₂Cl₂ | 95 | 0.80 | 90 | 59 | 8 | 21.8 | 10 | 2 | (C) | |
| −15 | CH₂Cl₂ | 95 | 1.1 | 88 | 58 | 10 | 21.3 | 11 | 2 | (C) | |
| −15 | CCl₄ | 83 | 0.06 | 94 | 65 | 10 | 16.5 | 7 | 1 | (B) | |
| −15 | CCl₄ | 83 | 0.35 | 94 | 60 | 13 | 18.0 | 9 | 1 | (B) | |
| −15 | CCl₄ | 83 | 0.38 | 97 | 59 | 16 | 16.5 | 9 | 1 | (B) | |
| −15 | CCl₄ | 83 | 0.43 | 96 | 55 | 17 | 17.8 | 11 | 0 | (B) | |
| −15 | CCl₄ | 83 | 0.88 | 95 | 57 | 18 | 16.0 | 11 | 1 | (B) | |
| −15 | CCl₄ | 83 | 2.2 | 76 | 54 | 18 | 14.8 | 12 | 1 | (B) | |
| −15 | CCl₄ | 83 | 2.2 | 94 | 58 | 17 | 13.2 | 11 | 2 | (B) | |
| −15 | CH₂Cl₂ | 83 | 0.02 | 91 | 71 | 3 | 19.0 | 5 | 1 | (B) | |
| −15 | CH₂Cl₂ | 83 | 0.18 | 94 | 64 | 6 | 22.8 | 6 | 1 | (B) | |
| −15 | CH₂Cl₂ | 83 | 0.27 | 91 | 67 | 4 | 22.5 | 5 | 1 | (B) | |
| −15 | CH₂Cl₂ | 83 | 0.30 | 91 | 65 | 5 | 23.8 | 6 | 1 | (B) | |
| −15 | CH₂Cl₂ | 83 | 0.58 | 93 | 61 | 8 | 22.2 | 8 | 1 | (B) | |
| −15 | CH₂Cl₂ | 83 | 1.3 | 93 | 58 | 9 | 20.3 | 10 | 2 | (B) | |
| −15 | CH₂Cl—CH₂Cl | 83 | 0.11 | 84 | 64 | 5 | 24.8 | 5 | 2 | (B) | |
| −15 | CH₂Cl—CH₂Cl | 83 | 0.18 | 88 | 62 | 6 | 24.8 | 7 | 2 | (B) | |
| −15 | CH₂Cl—CH₂Cl | 83 | 0.23 | 88 | 61 | 6 | 24.0 | 7 | 2 | (B) | |
| −15 | CH₂Cl—CH₂Cl | 83 | 1.5 | 92 | 47 | 11 | 19.0 | 13 | 7 | (B) | |
| −15 | CH₂Cl—CH₂Cl | 83 | 1.5 | 92 | 48 | 11 | 19.8 | 13 | 7 | (B) | |
| −15 | CH₂Cl—CH₂Cl | 83 | 0.45 | 93 | 58 | 8 | 23.0 | 8 | 2 | (B) | |
| −15 | CH₂Cl—CH₂Cl | 83 | 1.0 | 92 | 52 | 10 | 20.5 | 12 | 4 | (B) | |
| −15 | CH₂Cl—CH₂Cl | 83 | 0.16 | 79 | 61 | 5 | 25.8 | 6 | 2 | (A) | 75% conversion. |
| −15 | CHCl₃ | 83 | 0.04 | 92 | 70 | 4 | 19.8 | 5 | 0.8 | (A) | |
| −15 | CHCl₃ | 83 | 0.19 | 91 | 64 | 7 | 21.8 | 7 | 0.3 | (A) | |
| −15 | CHCl₃ | 83 | 0.36 | 96 | 62 | 9 | 21.0 | 8 | 0.5 | (A) | |
| −15 | CHCl₃ | 83 | 0.68 | 95 | 59 | 11 | 20.5 | 9 | 0.3 | (A) | |
| −15 | CHCl₃ | 83 | 1.3 | 94 | 58 | 13 | 18.5 | 11 | 1.3 | (A) | |
| −15 | CH₂Cl₂ | 38 | 0.064 | 90 | 66 | 8 | 19.8 | 6 | 1 | (C) | |
| −15 | CH₂Cl₂ | 38 | 0.21 | 94 | 65 | 7 | 20.5 | 6 | 1 | (C) | |
| −15 | CH₂Cl₂ | 38 | 0.42 | 97 | 63 | 10 | 21.0 | 7 | 1 | (A) | |
| −15 | CH₂Cl₂ | 38 | 0.3 | 94 | 62 | 9 | 22.0 | 6 | 1 | (A) | |
| −15 | CH₂Cl₂ | 38 | 0.5 | 97 | 64 | 9 | 21.3 | 6 | 1 | (A) | |
| −15 | CH₂Cl₂ | 38 | 0.5 | 95 | 60 | 11 | 21.3 | 7 | 1 | (B) | |
| −15 | CH₂Cl₂ | 38 | 1.0 | 97 | 55 | 15 | 18.0 | 11 | 2 | (B) | |
| −15 | CH₂Cl₂ | 38 | 1.2 | 94 | 58 | 13 | 19.0 | 9 | 1 | (C) | |
| −15 | CH₂Cl₂ | 38 | 5.8 | 91 | 46 | 14 | 15.0 | 13 | 7 | (C) | |

(A) Circulatory apparatus.  (B) 1,000-milliliter flask.  (C) 500-milliliter flask.

In the above tables, the percentage of substitution reported refers to the per cent of chlorine introduced into the reactor which reacted by substitution as distinguished from addition.

The relationship of several conditions of operation are shown by the results of these experiments. For example, when the invention is practiced at any one temperature of reaction and with a specific solvent, the maximum percentage of gamma isomer of benzene hexachloride which can be obtained increases as the concentration of the solvent increases and the optimum chlorine concentration for maximum gamma isomer decreases. Also, the optimum chlorine concentration for maximum gamma isomer decreases as the temperature is decreased from minus 15 to minus 40–60° C. Moreover, as the temperature is decreased from minus 15 to minus 40–60° C., the gamma concentration increases.

These and other relations will be apparent from further study of the results.

EXAMPLE II

A three-necked, 1000-milliliter flask equipped as described in Example I was employed. A solution of 130 grams of benzene, purified as described in Example I, and 334 grams of methylene chloride, purified as described in Example I, were placed in the flask. The apparatus was flushed with nitrogen for 60 minutes and then cooled to a temperature of minus 60° C.

Gaseous chlorine (at the rate of about 0.3 grams per minute) and nitrogen (at the rate of about 0.05 mole per hour) were mixed and passed into the reaction flask. The reaction was illuminated by a 125-watt Hanovia lamp placed 5 inches from the flask and a 200-watt Mazda lamp placed ½ inch from the opposite side of the flask and powered through a variable resistor with the voltage initially set at 120 volts. The chlorine concentration was maintained as nearly as possible throughout the reaction at the predetermined initial concentration of 0.02 per cent by weight of the benzene and methylene chloride by maintaining the reaction conditions such that the chlorine is reacted at about the same rate as the rate at which it enters the reaction mixture. This was controlled by varying the distance of the light source from the reaction flask and varying the voltage applied to the light source.

During the reaction, the chlorine concentrations were determined at 15-minute intervals by the method described in Example I. The reaction was discontinued when approximately 18 per cent of the benzene had been converted to benzene hexachloride.

The benzene hexachloride was recovered by distilling off the unreacted benzene and methylene chloride and finally heating the reaction mixture to a liquid temperature of 140–150° C. at 10 millimeters of mercury pressure for 10 minutes. The molten benzene hexachloride at 140° C. was flaked on a nickel sheet at 25° C., ground and analyzed by infrared analysis for the various isomers. The analysis in per cent by weight was as follows:

| | Per cent |
|---|---|
| Alpha | 58 |
| Beta | 7 |
| Gamma | 26.3 |
| Delta | 7 |
| Epsilon | 1 |

The yield of benzene hexachloride, based upon weight of chlorine charged to the reaction, was 95 per cent by weight. A chromatographic analysis of the isomers produced showed a gamma isomer percentage of 25.6 per cent by weight.

EXAMPLE III

The circulatory apparatus described in Example I was employed. A solution of 90 grams of benzene and 440 grams of ethylene dichloride, each purified as in Example I, was placed in the apparatus. The apparatus was flushed with nitrogen for 60 minutes and then cooled to a temperature of minus 15° C.

Gaseous chlorine (at the rate of about 0.6 grams per minute) and nitrogen (at the rate of about 0.05 mole per hour) were mixed and passed into the apparatus. The reaction was illuminated by two 40-watt Mazda lamps placed inside the apparatus and powered through a variable resistor. The chlorine concentration was maintained as nearly as possible at 0.16 per cent by weight of the benzene and ethylene dichloride by varying the voltage applied to the lamp.

The reaction was continued for about 400 minutes and approximately 74.5 per cent by weight of the benzene was converted to benzene hexachloride. During the reaction, the chlorine concentrations were determined at 60 to 90-minute intervals by the method described in Example I.

The concentrations obtained, in per cent by weight of benzene plus ethylene dichloride, were as follows:

| | Per cent |
|---|---|
| 90 minutes | 0.19 |
| 180 minutes | 0.12 |
| 240 minutes | 0.14 |
| 330 minutes | 0.16 |
| 390 minutes | 0.18 |
| Average | 0.16 |

The benzene hexachloride obtained contained 25.8 per cent by weight of gamma isomer.

EXAMPLE IV

The circulatory apparatus described in Example I was employed with several modifications. In this example, black friction tape was used in lieu of the chlorinated isoprene coating and one portion of vertical column 2 was not covered with this tape to provide a window. This window was approximately 3½ inches high, starting at a point 5¼ inches from the bottom of the column, and it extended halfway around the tube. Actinic irradiation was provided by directing the light from a Westinghouse RS 275-watt Sun-lamp into the window. The distance between the closest portions of the lamp and column varied from 3/16 to 1 inch. Although no light was placed within vertical column 2 inside of protector tube 6, tube 6 was not removed from the apparatus.

The procedure outlined in Example I was followed except that where necessary changes in the technique of separating the product and solvent was different. Thus, with acetic anhydride which has a higher boiling point than the partially halogenated hydrocarbons, separation was accomplished by washing with water.

Reaction mixtures of benzene and the solvent contained 80 mole per cent solvent. The solvents employed were acetic anhydride, acetyl chloride, methyl sulfate, and sulfuryl chloride. Table II lists the results:

Table II

| Reaction Temp., °C. | Solvent | Average Chlorine Conc. Percent | Isomer Content (Percent) | | | | |
|---|---|---|---|---|---|---|---|
| | | | α | β | γ | Δ | ε |
| −40 | (Ac)₂O | 0.037 | 50.3 | 5.4 | 30.5 | 10.9 | 3.3 |
| −40 | (Ac)₂O | 0.043 | 53.1 | 3.9 | 30.2 | 9.7 | 2.4 |
| −40 | (Ac)₂O | 0.088 | 50.9 | 6.8 | 30.2 | 9.1 | 0.8 |
| −40 | (Ac)₂O | 0.122 | 49.2 | 10.2 | 26.2 | 11.8 | 2.1 |
| −40 | (Ac)₂O | 0.123 | 49.3 | 6.8 | 27.9 | 11.3 | 3.6 |
| −40 | (Ac)₂O | 0.142 | 49.2 | 7.1 | 28.6 | 11.1 | 2.9 |
| −40 | (Ac)₂O | 0.143 | 47.7 | 8.9 | 26.7 | 12.7 | 1.3 |
| −40 | (Ac)₂O | 0.181 | 47.7 | 9.9 | 24.7 | 12.6 | 2.7 |
| −40 | (Ac)₂O | 0.277 | 48.4 | 8.4 | 27.8 | 12.1 | 3.6 |
| −40 | (Ac)₂O | 0.285 | 43.0 | 12.2 | 20.4 | 15.1 | 3.8 |
| −40 | (Ac)₂O | 0.485 | 32.0 | 2.3 | 15.6 | 19.5 | 2.6 |
| −40 | (Ac)₂O | 0.580 | 38.0 | 16.4 | 15.9 | 19.8 | 8.1 |
| −37 | (Ac)₂O | 0.106 | 52.3 | 6.5 | 30.0 | 8.7 | 2.0 |
| −30 | (Ac)₂O | 0.050 | 53.7 | 3.6 | 30.6 | 8.9 | 2.2 |
| −30 | (Ac)₂O | 0.056 | 56.9 | 4.5 | 28.7 | 9.0 | 2.2 |
| −30 | (Ac)₂O | 0.130 | 53.0 | 6.6 | 29.4 | 8.8 | 1.7 |
| −30 | (Ac)₂O | 0.314 | 45.3 | 9.5 | 24.7 | 14.6 | 5.5 |

| Reaction Temp., °C. | Solvent | Average Chlorine Conc. Percent | Isomer Content (Percent) α, β, γ, Δ, ε | | | | |
|---|---|---|---|---|---|---|---|
| −15 | CH₃COCl | 0.089 | 24.6 | | | | |
| −15 | CH₃COCl | 0.140 | 27.4 | | | | |
| −15 | CH₃COCl | 0.179 | 24.4 | | | | |
| −15 | CH₃COCl | 0.187 | 26.5 | | | | |
| −30 | (CH₃O)₂SO₂ | 0.072 | 28.0 | | | | |
| −40 | SO₂Cl₂ | — | 26.3 | | | | |

| Reaction Temp., °C. | Solvent | Average Chlorine Conc. Percent | α | β | γ | Δ | ε |
|---|---|---|---|---|---|---|---|
| −24 | C₂H₅COOH | 0.104 | 67.0 | 5.8 | 20.6 | 6.3 | 0.7 |
| −24 | {CH₃COOH* / (Ac)₂O} | 0.257 | 49.0 | 5.4 | 24.0 | 11.3 | 3.4 |

*Mixture consisted of 3.160 moles acetic anhydride, 1.052 moles acetic acid, and 1.280 moles benzene.

EXAMPLE V

Following the general procedure described in Example I and employing the circulatory apparatus described therein, 200 milliliters of benzene was charged to the apparatus and cooled. Thereafter, 270 milliliters of liquid phosgene at minus 80° C. was added to form the liquid reaction mixture containing 72 per cent by weight of phosgene. Duplicating the techniques described in Example I, addition chlorination of the benzene was effected at minus 15° C. At the conclusion of the introduction of chlorine, the phosgene was permitted to boil off and then the remaining material was heated on a steam bath with a stream of air being passed into the container to remove any remaining solvent. Thereafter, the product was recovered and analyzed. Table III summarizes the results:

Table III

CHLORINATION OF BENZENE IN 72% PHOSGENE AT MINUS 15° C.

| Average Chlorine Conc., Percent | Yield, Percent | Isomer Distribution (Percent) | | | | |
|---|---|---|---|---|---|---|
| | | α | β | γ | Δ | ε |
| 0.076 | 97 | 68.8 | 5.5 | 19.5 | 5.0 | 1.0 |
| 0.06 | 97 | 67.0 | 6.0 | 18.3 | 4.3 | 1.0 |
| 0.12 | 90 | 64.0 | 8.8 | 18.5 | 6.0 | 1.0 |
| 0.45 | 97 | 60.5 | 11.8 | 17.8 | 7.8 | 1.0 |

EXAMPLE VI

Employing the circulatory apparatus described in Example I, and following the procedure outlined therein, a reaction solution comprising 28% benzene, 36% acetic acid, and 36% propionic acid by weight was additively chlorinated at minus 15° C. The propionic acid was purified by distillation through a 1.7 x 20 centimeter Fenske column, while chemically pure grade acetic acid was used.

At the conclusion of the reaction period, 400 milliliters of benzene was added to the reaction mixture and it was washed several times with water. The benzene solution was then evaporated to dryness on a steam bath while passing a stream of air over the solution. Recovery and analysis of the product was accomplished according to the manner described in Example I with the following results:

Table IV

| Average Chlorine Concentration, Percent | Gamma Isomer Content, Percent |
|---|---|
| 0.27 | 20.5 |
| 0.53 | 20.8 |
| 0.55 | 20.0 |

The reaction may also be carried out in the presence of a peroxydicarbonate ester in lieu of or in combination with actinic light. The peroxydicarbonate esters which may be employed in connection with the practice of the invention are compounds having the probable structure:

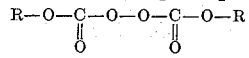

where R is an organic radical derived from an alcohol and linked to the oxygen atoms through carbon. These esters may be prepared by reaction of sodium peroxide with a chloroformate in aqueous media, usually at 0° to 10° C. The esters may be regarded as esters of the theoretical peroxydicarbonic acid having the theoretical structure:

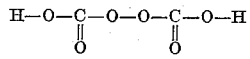

These esters normally are liquids or white solids which are soluble in organic solvents, such as methyl or ethyl alcohol, and which in many cases decompose at relatively low temperatures, for example below about 60° C. Further details concerning the properties of the peroxydicarbonates herein contemplated are given in U. S. Letters Patent No. 2,370,588, granted to Franklin Strain, February 27, 1945.

Peroxydicarbonate esters of various alcohols or hydroxy compounds which contain up to 10 carbon atoms have been found to be successful. For example, the peroxydicarbonates of aliphatic monohydric alcohols, such as methyl, ethyl, n-propyl, isopropyl, butyl, isobutyl, amyl, hexyl, allyl, methallyl, crotyl, dimethallyl, methyl vinyl carbinyl, linallyl, cinnamyl, and 2-ethyl hexyl alcohol, have been found to be suitable. Peroxydicarbonate esters of halo alcohols, such as 2-chloro ethanol, 2-chloroallyl alcohol, propylene chlorohydrin, glycerol dichlorohydrin, etc., may be used according to this invention. Esters of ethyl alcohols, such as 2-ethoxy ethyl alcohol, 2-n-butoxy ethyl alcohol, and similar ether alcohols also are suitable.

The amount of peroxydicarbonate ester which is required in order to catalyze this reaction is quite small. In fact, even traces have been observed to have an advantageous effect. For most purposes, a catalytic amount, up to about 0.1 to 1 per cent by weight of the peroxydicarbonate, is used, based on the weight of benzene and solvent. However, larger amounts of 3 per cent, or even as high as 5 per cent or more, may be used if they are necessary to maintain the chlorine concentration constant, for example, when very low chlorine concentrations are to be maintained. In order to ensure the proper amount of peroxydicarbonate throughout the reaction, it frequently is desirable to dissolve the peroxydicarbonate in a small portion of one or both of the reactants, and to add the solution to the reacting mixture.

One method of practicing the invention with these peroxydicarbonate esters is as follows:

EXAMPLE VII

The circulatory apparatus described in Example I was employed. Light was excluded from the reaction vessel by wrapping it with aluminum foil and performing the experiment in a dark hood.

Into the apparatus was placed 358 grams of purified methylene chloride, 74 grams of purified benzene, and a sufficient amount of isopropyl peroxydicarbonate to provide the percentage designated in Table V.

Addition of isopropyl peroxydicarbonate to the reaction mixture was effected by preparing a benzene solution of the catalyst. This was accomplished by adding the catalyst from a flask immersed in Dry Ice, with a spatula cooled in Dry Ice, into a tared flask containing benzene at room temperature.

The benzene, methylene chloride, and isopropyl peroxydicarbonate solution was purged at room temperature with essentially pure nitrogen for from one to two hours at the rate of 0.05 mole per hour. The solution was then cooled to minus 15° C. in a Dry Ice-acetone bath. A sample was withdrawn and analyzed by acetone solution method for isopropyl peroxydicarbonate.

Gaseous chlorine was then added with the nitrogen to the reaction solution, at the rates and for the time period indicated in Table V, while maintaining the temperature at minus 15° C. During the reaction, five samples were withdrawn and analyzed for chlorine concentration, using the aqueous potassium iodide solution method. At the end of the chlorine addition period, the reaction mixture was maintained at minus 15° C. for two hours with the nitrogen flow continuing. This nitrogen purge was continued overnight while the reaction mixture warmed to room temperature. Another sample was taken and analyzed for catalyst concentration.

The benzene hexachloride was recovered by heating the reaction mixture to a liquid temperature of 140° C. at atmospheric temperature, and then at 10–20 millimeters of mercury and 140° C. for about 15 minutes to distill off the unreacted benzene and methylene chloride. The molten benzene hexachloride at 140° C. was flaked on a sheet of nickel metal at room temperature, pulverized to a fine powder, and analyzed by infrared analysis for isomer distribution.

Results and operating conditions are summarized in Table V:

Table V

| Isopropyl Peroxydicarbonate, Percent by weight of solution | | Chlorine Addition | | Chlorine Concentration, Percent | | Yield* percent | Percent Gamma isomer in Benzene hexachloride Product |
|---|---|---|---|---|---|---|---|
| Initial | Final | Rate, grams per Minute | Time, Minutes | Range | Average | | |
| 0.20 | 0.19 | 0.23 | 155 | 0.9–1.4 | 1.1 | 88 | 19.0 |
| 0.97 | 0.84 | 0.65 | 120 | 0.9–1.1 | 1.0 | 90 | 19.3 |
| 2.87 | 2.58 | 0.25 | 240 | 0.85–.33 | 0.6 | 94 | 20.5 |

*Based on amount of chlorine added.

Peroxydicarbonate esters may be used in combination with actinic light in this invention to produce benzene hexachloride containing enhanced gamma isomer contents. Gamma isomer contents in excess of 20 per cent by weight of the benzene hexachloride are attainable by resort to optimum reaction conditions.

The following example illustrates the combined use of peroxydicarbonate esters and actinic light.

EXAMPLE VIII

The apparatus consisted of a 1000-milliliter, three-necked glass flask with a well substituted for one of the side necks. A 6-watt G. E. filament bulb was lowered into the bottom of the well and positioned near the geometric center of the flask. The center neck was provided with a stirrer bushing and gas outlet tube. A nickel blade stirrer, operable at 100 to 200 revolutions per minute for agitating the reaction mixture, was fitted in the bushing and disposed in the flask. The gas inlet tube was attached to the side neck along with a thermometer.

The system and mixture were purged by sweeping with 0.2 mole per hour of nitrogen for two hours at room temperature, while agitating, with the light source inoperative. The charge comprised 156 grams (2.0 moles) benzene, 758 grams methylene chloride, and 27.4 grams (3 per cent by weight of the benzene and methylene chloride) of isopropyl peroxydicarbonate. After purging, the reaction mixture was cooled to minus 15° C. and then chlorine, at 0.9 gram per minute, with nitrogen, at 0.05 mole per hour, was added through the inlet tube for four hours while maintaining the temperature at minus 15° C. and continuing the agitation.

Concurrently with starting the flow of chlorine through, the irradiation was begun by operating the light source at 120 volts.

Chlorine concentrations were determined by removing a sample of the reaction every half hour and analyzing in accordance with the procedure described in Example I. Isopropyl peroxydicarbonate concentration was determined at the start and finish of the run. At the end of the run, the benzene hexachloride was recovered in the manner set forth in Example I. Table VI summarizes the results and exact experimental conditions:

*Table VI*

| Total Charge | 914 grams. |
| Methylene chloride | 758 grams. |
| Benzene | 156 grams. |
| Isopropyl peroxydicarbonate | 27.4 grams. |
| Isopropyl peroxydicarbonate concentration:[1] | |
| Start | 2.93 percent. |
| Finish | 3.02 percent. |
| Gamma Isomer | 21.3 percent. |
| Yield | 92 percent. |
| Chlorine Rate [2] | 0.898 grams per minute. |

| Time, Minutes | Chlorine Concentration, Percent | Conversion, Percent |
|---|---|---|
| 0 | | 0.0 |
| 30 | 0.5 | 6.5 |
| 60 | 0.39 | 12.5 |
| 90 | 0.34 | 19.0 |
| 120 | 0.31 | 25.5 |
| 150 | 0.295 | 31.5 |
| 180 | 0.285 | 38.0 |
| 210 | 0.295 | 42.0 |
| 240 | 0.30 | 50.7 |

[1] By weight of benzene and methylene chloride.
[2] Obtained by dividing the weight of chlorine used by 240 minutes.

It is also possible to practice this invention by resort to still other catalysts in lieu of or in combination with actinic light and/or the aforedisclosed peroxydicarbonate esters. For instance, satisfactory yields of benzene hexachloride containing gamma isomer contents consistently in excess of the 12 to 16 per cent obtainable by the various chlorination processes known to the art, and, under optimum reaction conditions, above 19 or 20 per cent by weight of the gamma isomer, have been produced when monophenylacetyl peroxide is the catalyst.

Use of this catalyst to provide satisfactory benzene hexachloride yields may be accomplished by essentially following the steps of Example VII while substituting the peroxide for the isopropyl peroxydicarbonate. Because monophenylacetyl peroxide is unstable at room temperatures, it is generally necessary to either freshly prepare it prior to use or to store it at sub-zero temperatures, such as at minus 30° C. The amount of monophenylacetyl peroxide which is required to catalyze this reaction is small. Slight traces of this compound in the reaction mixture will produce measurable results. About 0.1 to about 2 per cent by weight of the peroxide is normally used. Even higher amounts up to 5 per cent by weight may be utilized if such is necessary to maintain a constant chlorine concentration, such as the constant low chlorine concentrations of this invention.

EXAMPLE IX

Results obtained by essentially duplicating the experiment enumerated in Example VII, while using monophenylacetyl peroxide in lieu of isopropyl peroxydicarbonate in four separate runs, are tabulated in Table VII:

*Table VII*

| Temperature, °C. | Mono-phenyl acetyl Peroxide, Percent by weight of solution | Chlorine Addition, Grams per Minute | Chlorine Concentration, Percent | | Yield* Percent | Percent Gamma isomer in Benzene hexachloride Product |
|---|---|---|---|---|---|---|
| | | | Range | Average | | |
| 0 | 0.4 | 0.3 | 0.13–0.31 | 0.2 | 88 | 19.5 |
| 0 | 0.4 | 1.2 | 0.24–0.33 | 0.3 | 91 | 20.0 |
| 0 | 0.1 | 0.7 | 0.64–0.98 | 0.8 | 93 | 19.3 |
| −15 | 1.2 | 0.3 | 0.81–0.36 | 0.6 | 97 | 21.3 |

*Based on amount of chlorine added.

EXAMPLE X

Duplicating Example VII, with the exception that trichloroacetyl peroxide is employed in lieu of isopropyl peroxydicarbonate, gave the results tabulated below:

*Table VIII*

| Temp., °C. | Trichloroacetyl Peroxide, Percent by weight of solution | Chlorine addition, Grams per minute | Average Chlorine Concentration, Percent | Yield, Percent | Percent Gamma Isomer in Product |
|---|---|---|---|---|---|
| 0 | 0.20 | 0.76 | 0.15 | 84 | 20.5 |
| 0 | 0.20 | 2.1 | 0.29 | 89 | 21.0 |
| 0 | 0.20 | 2.1 | 0.39 | 89 | 20.8 |
| 0 | 0.20 | 2.1 | 0.40 | 90 | 20.3 |
| 0 to 5 | 0.20 | 5.3 | 0.54 | 86 | 20.5 |
| −5 | 0.42 | 0.3 | 0.09 | 82 | 19.0 |
| −5 | 0.10 | 0.3 | 0.6 | 89 | 20.5 |
| −5 | 0.20 | 0.3 | 0.41 | 87 | 22.0 |
| −5 | 0.20 | 0.76 | 0.54 | 91 | 21.1 |
| −5 | 0.40 | 0.76 | 0.28 | 93 | 22.0 |
| −5 | 0.40 | 2.1 | 0.47 | 93 | 21.0 |
| −10 | 0.20 | 0.15 | 0.74 | 83 | 20.0 |
| −10 | 0.40 | 0.76 | 0.72 | 92 | 21.6 |
| −10 | 0.40 | 0.3 | 0.36 | 89 | 21.7 |
| −10 | 0.40 | 0.1 | 0.17 | 84 | 21.5 |
| −10 | 0.40 | 0.76 | 0.50 | 91 | 20.5 |

Catalysis of the addition chlorination of benzene to produce benzene hexachloride containing gamma isomer contents exceeding the 12 to 16 per cent attainable by the various chlorination processes already known to the art may be achieved in the absence of actinic irradiations when certain aqueous alkaline solutions are employed in lieu of other catalysts or activating influences. Resort to optimum reaction conditions in this process makes possible gamma isomer yields in excess of 19 or 20 per cent by weight of benzene hexachloride.

The reaction may be carried out without resort to actinic irradiation by addition of gaseous or liquid chlorine to a mixture of an aqueous solution of one of the aforementioned materials, for example, sodium hydroxide, one of the aforementioned solvents such as methylene chloride, and benzene, while maintaining the temperature below the freezing point of benzene and above the freezing point of the mixture, and agitating the reaction mixture vigorously.

As explained in the discussion of actinic light catalysis, solvent concentrations as high as 99 per cent by weight of the total weight of the mixture of the halogenated hydrocarbon and benzene may be used.

Although the experiments conducted above have all been performed as a batch process, the invention is suitable for adaptation to a continuous flow process. In a flow process, the solvent is recycled and cooled with additional chlorine and benzene being added to the solvent prior to or after cooling or being added to the reactor. When large size reactors are employed, it is preferable to have the light source within the reactor to ensure uniform and complete irradiation. The product is withdrawn from the reactor at regular intervals.

Although the present invention has been described with reference to specific details of certain embodiments thereof, it is not intended that such details shall be regarded as limitations upon the scope of the invention except insofar as included in the accompanying claims.

This application is a continuation-in-part of application Serial No. 225,854 of Joseph A. Neubauer, Franklin Strain, and Frederick E. Kung, filed May 11, 1951, now abandoned, and application Serial No. 283,824 of Joseph A. Neubauer, Franklin Strain, and Frederick E. Kung, filed April 23, 1952.

We claim:

1. In a method of reacting chlorine and benzene to form benzene hexachloride, the improvement which comprises providing chlorine in a liquid mixture containing benzene and an inert polar solvent which at 20° C. has a dielectric constant of at least about 4, maintaining an appreciable chlorine concentration in said mixture from 0.001 per cent up to 1.5 per cent by weight of the unreacted benzene and solvent and maintaining the reaction mixture at a temperature below the freezing point of benzene but above the temperature at which the mixture is solid.

2. The method of claim 1 in which the chlorine concentration is maintained at 0.005 to 1.0 per cent by weight of the unreacted benzene and solvent.

3. The method of claim 1 in which the reaction mixture is at a temperature of about minus 10° C. to about minus 80° C.

4. A method of preparing benzene hexachloride which comprises irradiating with actinic light a mixture of benzene and an inert polar solvent which at 20° C. has a dielectric constant of at least about 4, introducing chlorine into said mixture at a rate sufficient to maintain in the mixture an appreciable chlorine concentration of from 0.001 per cent up to 1.5 per cent by weight of the unreacted benzene and solvent and maintaining the reaction mixture at a temperature below the freezing point of benzene but above the temperature at which the mixture is solid.

5. In a method of reacting chlorine and benzene to form benzene hexachloride, the improvement which comprises providing chlorine in a liquid mixture of benzene and an aliphatic partially halogenated hydrocarbon which contains up to 4 carbon atoms and having a carbon atom linked to at least one hydrogen atom and at least one halogen atom, maintaining an appreciable chlorine concentration in said mixture from 0.001 per cent up to 1.5 per cent by weight of the unreacted benzene and halogenated hydrocarbon, and maintaining the temperature of the mixture below the freezing point of benzene but above the temperature at which the entire mixture is solid.

6. In a method of reacting chlorine and benzene to form benzene hexachloride, the improvement which comprises providing chlorine in a liquid mixture of benzene and an aliphatic partially chlorinated hydrocarbon which contains up to 4 carbon atoms and having a carbon atom linked to at least one hydrogen atom and at least one chlorine atom, maintaining an appreciable chlorine concentration in said mixture from 0.001 per cent up to 1.5 per cent by weight of the unreacted benzene and chlorinated hydrocarbon, and maintaining the temperature of the mixture below the freezing point of benzene but above the temperature at which the entire mixture is solid.

7. The method of claim 6 in which the chlorinated hydrocarbon is methyl chloride.

8. The method of claim 6 in which the chlorinated hydrocarbon is chloroform.

9. The method of claim 6 in which the chlorinated hydrocarbon is methylene chloride.

10. The method of claim 6 in which the chlorinated hydrocarbon is ethylene dichloride.

11. The method of claim 6 in which the chlorine concentration is maintained at 0.005 to 1.0 per cent by weight of the unreacted benzene and chlorinated hydrocarbon.

12. In a method of reacting chlorine and benzene to form benzene hexachloride, the improvement which comprises providing chlorine in a mixture of benzene and an aliphatic partially chlorinated hydrocarbon, said chlorinated hydrocarbon being selected from the group consisting of methyl chloride, chloroform, methylene chloride, and ethylene dichloride, maintaining an appreciable chlorine concentration in said mixture from 0.001 per cent up to 1.5 per cent by weight of unreacted benzene and chlorinated hydrocarbon, and maintaining the temperature of the mixture below the freezing point of benzene but above the temperature at which the entire mixture is solid.

13. A method of preparing benzene hexachloride which comprises irradiating with actinic light a mixture of benzene and an aliphatic partially halogenated hydrocarbon which contains up to 4 carbon atoms and having a carbon atom linked to at least one hydrogen atom and at least one halogen atom and which is liquid at reaction temperature, introducing chlorine into said mixture at a rate sufficient to maintain in the mixture an appreciable chlorine concentration of at least 0.001 per cent but not in excess of 1.5 per cent based upon the weight of the mixture, and maintaining the temperature of the mixture below the freezing point of benzene but above the temperature at which the entire mixture is solid.

14. A method of preparing benzene hexachloride which comprises irradiating with actinic light a mixture of benzene and an aliphatic partially chlorinated hydrocarbon which contains up to 4 carbon atoms and having a carbon atom linked to at least one hydrogen atom and at least one chlorine atom and which is liquid at reaction temperature, introducing chlorine into said mixture at a rate sufficient to maintain in the mixture an appreciable chlorine concentration of at least 0.001 per cent but not in excess of 1.5 per cent based upon the weight of the mixture, and maintaining the temperature of the mixture below the freezing point of benzene but above the temperature at which the entire mixture is solid.

15. A method of preparing benzene hexachloride which comprises irradiating with actinic light a mixture of benzene and an aliphatic partially chlorinated hydrocarbon which contains up to 4 carbon atoms and having a carbon atom linked to at least one hydrogen atom and at least one chlorine atom and which is liquid at reaction temperature, introducing chlorine into said mixture at a rate sufficient to maintain in the mixture a chlorine concentration of 0.005 to 1.0 per cent based upon the weight of the mixture, and maintaining the temperature of the mixture below the freezing point of benzene but above the temperature at which the entire mixture is solid.

16. A method of preparing benzene hexachloride which comprises irradiating with actinic light a mixture of benzene and methyl chloride, introducing chlorine into said mixture at a rate sufficient to maintain in the mixture an appreciable chlorine concentration of at least 0.001 per cent but not in excess of 1.5 per cent based upon the weight of the mixture, and maintaining the temperature of the mixture below the freezing point of benzene but above the temperature at which the entire mixture is solid.

17. A method of preparing benzene hexachloride which comprises irradiating with actinic light a mixture of benzene and methylene chloride, introducing chlorine into said mixture at a rate sufficient to maintain in the mixture an appreciable chlorine concentration of at least 0.001 per cent but not in excess of 1.5 per cent based upon the weight of the mixture, and maintaining the temperature of the mixture below the freezing point of benzene but above the temperature at which the entire mixture is solid.

18. A method of preparing benzene hexachloride which comprises irradiating with actinic light a mixture of benzene and ethylene dichloride, introducing chlorine into said mixture at a rate sufficient to maintain in the mixture an appreciable chlorine concentration of at least 0.001 per cent but not in excess of 1.5 per cent based upon the weight of the mixture, and maintaining the temperature of the mixture below the freezing point of benzene but above the temperature at which the entire mixture is solid.

19. A method of preparing benzene hexachloride which comprises irradiating with actinic light a mixture of benzene and chloroform, introducing chlorine into said mixture at a rate sufficient to maintain in the mixture an appreciable chlorine concentration of at least 0.001 per cent but not in excess of 1.5 per cent based upon the weight of the mixture, and maintaining the temperature of the mixture below the freezing point of benzene but above the temperature at which the entire mixture is solid.

20. A method of preparing benzene hexachloride which comprises irradiating with actinic light a mixture of benzene and an aliphatic partially chlorinated hydrocarbon which contains up to 4 carbon atoms and having a carbon atom linked to at least one hydrogen atom and at least one chlorine atom and which is liquid at reaction temperature, the concentration of the partially chlorinated hydrocarbon being from 30 to 95 per cent by weight of the mixture, introducing chlorine into said mixture at a rate sufficient to maintain in the mixture an appreciable chlorine concentration of at least 0.001 per cent but not in excess of 1.5 per cent based upon the weight of the mixture, and maintaining the temperature of the mixture between the range of minus 10° to minus 80° C.

21. A method of preparing benzene hexachloride which comprises irradiating with actinic light a mixture of benzene and a compound selected from the group consisting of methyl chloride, methylene chloride, chloroform, and ethylene dichloride, introducing chlorine into said mixture at a rate sufficient to maintain in the mixture an appreciable chlorine concentration of at least 0.001 per cent but not in excess of 1.5 per cent based upon the weight of the mixture and maintaining the temperature of the mixture below the freezing point of benzene but above the temperature at which the entire mixture is solid.

22. A method of preparing benzene hexachloride which comprises irradiating with actinic light a mixture of benzene and a compound selected from the group consisting of methyl chloride, methylene chloride, chloroform, and ethylene dichloride, the concentration of the compound being from 30 to 95 per cent by weight of the mixture, introducing chlorine into said mixture at a rate sufficient to maintain in the mixture an appreciable chlorine concentration of at least 0.001 per cent but not in excess of 1.5 per cent based upon the weight of the mixture, and maintaining the temperature of the mixture below the freezing point of benzene but above the temperature at which the entire mixture is solid.

23. The process of claim 15 wherein the partially chlorinated hydrocarbon is methyl chloride.

24. The process of claim 15 wherein the partially chlorinated hydrocarbon is methylene chloride.

25. The process of claim 15 wherein the partially chlorinated hydrocarbon is ethylene dichloride.

26. The process of claim 15 wherein the partially chlorinated hydrocarbon is chloroform.

27. In a method of reacting chlorine and benzene to form benzene hexachloride, the improvement which comprises providing chlorine in a liquid mixture of benzene and an aliphatic partially halogenated hydrocarbon which contains up to 4 carbon atoms and having a carbon atom linked to at least one hydrogen atom and at least one halogen atom, maintaining an appreciable chlorine concentration in said mixture from 0.001 per cent up to 1.5 per cent by weight of the mixture throughout substantially the entire reaction period and maintaining the temperature of the mixture below the freezing point of benzene but above the temperature at which the entire mixture is solid.

References Cited in the file of this patent

UNITED STATES PATENTS

| | | |
|---|---|---|
| 2,513,092 | Gonze | June 27, 1950 |
| 2,550,046 | Waal | Apr. 24, 1951 |
| 2,558,363 | Kolka et al. | June 26, 1951 |
| 2,628,260 | Britton et al. | Feb. 10, 1953 |

FOREIGN PATENTS

| | | |
|---|---|---|
| 249,119 | Switzerland | June 15, 1947 |
| 656,457 | Great Britain | Aug. 22, 1951 |
| 471,772 | Belgium | Apr. 1, 1947 |

OTHER REFERENCES

Neil et al., Canadian Chemistry and Process Industries, vol. 32 (April 1948), pp. 335–40.